Nov. 21, 1939.   M. N. DODGE   2,181,109
CONFECTION
Filed March 27, 1939

POPCORN

POPCORN
SUGAR COATING

POPCORN
SUGAR COATING
CHOCOLATE

Inventor
MARY N. DODGE
By Hazard and Miller
Attorneys

Patented Nov. 21, 1939

2,181,109

UNITED STATES PATENT OFFICE 2,181,109

CONFECTION

Mary N. Dodge, Studio City, Calif.

Application March 27, 1939, Serial No. 264,372

3 Claims. (Cl. 99—138)

My invention relates to a confection.

As well known, popcorn is at its best immediately after its preparation and should be eaten within a short time thereafter, otherwise it will lose its desirable crispness and crunchiness. The deterioration of popcorn is due to the absorption of moisture from the atmosphere which causes it to become stale and tough, losing its palateness. The popcorn of the trade is usually bought at the place of its preparation or in stores in the latter of which it is handled in airtight containers. By reason of the bulk of the popcorn such containers are large and involve a considerable expense considering the low price of the popcorn itself.

Attempts have been made to coat popcorn with chocolate and while such coating would prevent access of air it does not prevent the popcorn from losing its crispness for the reason that chocolate contains an oil which is absorbed by the ruptured starch cells of the popcorn.

I have discovered a method whereby the popcorn may be chocolate coated and still retain indefinitely its crispness and crunchiness. I effect this result by covering the fresh popcorn with an edible coating or glaze which seals the grains of the popcorn against access of air and which is not affected by the oil naturally contained in chocolate, and then dipping or otherwise coating the popcorn thus treated with chocolate.

My invention consists in the steps of the method and the resulting product hereinafter described and claimed.

Figure 1:
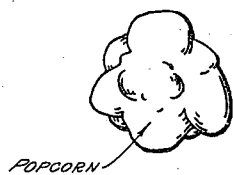
Figure 2:
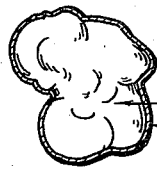
Figure 3:
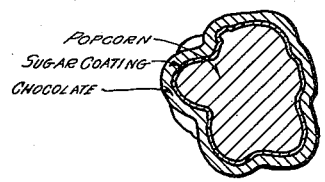
Figure 4:
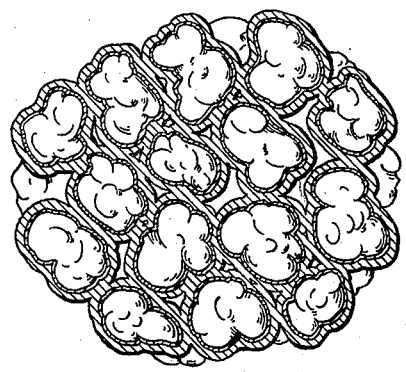

In the accompanying drawing forming a part of the specification I have illustrated the successive steps of the method and the final product, in which:

Fig. 1 shows the popcorn that has been "popped";

Fig. 2 partly in transverse section showing the sugar coating;

Fig. 3 is a cross section showing the finished product with the sugar coating;

Fig. 4 an aggregate of chocolate-dipped popcorn; and

Figure 5:
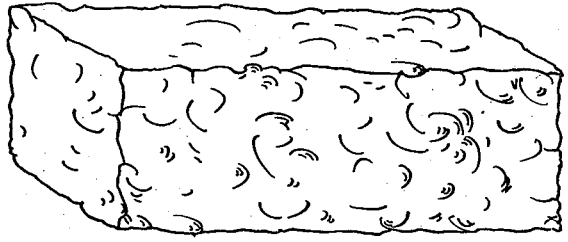

Fig. 5 an aggregate having the shape of a bar.

I take freshly prepared popcorn and dip the same in cooked candy syrup to which various flavors and various candy and dried fruits including hard candies or chopped nuts may be added. Candy syrup is prepared by boiling sugar with a small quantity of water until more or less of conversion of the sugar has taken place so that on cooling and hardening of the candy syrup no recrystallization of the sugar will take place. The grains of the popcorn thus coated with a thin layer of candy syrup are allowed to cool and dry and then are dipped in chocolate to provide a coating.

The final product may consist of individual grains of popcorn chocolate coated in the manner described or may be caused to aggregate in aggregates or shaped into any desired form such as balls or bars.

While my invention is primarily intended for the treatment of popcorn, it will be obvious that it is also applicable to other puffed cereals such as rice and wheat which, as well known, have their starch cells ruptured and expanded by the sudden release of high pressure steam. The glossy skin of the popcorn grain on heating is ruptured by the sudden release and expansion of the steam generated within which ruptures the skin and "puffs" the starch grains.

In place of the candy syrup the popcorn may be coated with some other edible coating which prevents access of air to the starch grains and is unaffected by the oil and moisture of the chocolate.

Various changes may be made in the steps of the method by those skilled in the art without departing from the spirit of my invention as claimed.

I claim:

1. A method of treating a puffed cereal comprising coating the same with an edible liquid capable of hardening on coating to provide a seal against the atmosphere and dipping the same in chocolate.

2. A method of treating puffed popcorn comprising coating the same with candy syrup, allowing the coating to harden, and dipping the popcorn in chocolate.

3. A confection comprising a puffed cereal having an exterior coating of chocolate and a glaze-like coating of hardened candied syrup interposed between the surface of the puffed cereal and the chocolate coating, whereby the coating of the hardened candied syrup prevents access of air to the puffed cereal and the puffed cereal is unaffected by the oil and moisture of the chocolate coating.

MARY N. DODGE.